July 18, 1967 D. H. McCOMBS 3,331,225
LINT FILTER

Filed Aug. 9, 1965 2 Sheets-Sheet 1

WITNESSES
Theodore F. Wrobel
B B Sklar, Jr.

INVENTOR
Darwin H. McCombs
BY
Ralph T. French
ATTORNEY

July 18, 1967  D. H. McCOMBS  3,331,225
LINT FILTER

Filed Aug. 9, 1965  2 Sheets-Sheet 2

United States Patent Office 3,331,225
Patented July 18, 1967

3,331,225
LINT FILTER
Darwin H. McCombs, Merritt Island, Fla., assignor to Westinghouse Electric Corporation, Pittsburgh, Pa., a corporation of Pennsylvania
Filed Aug. 9, 1965, Ser. No. 478,323
4 Claims. (Cl. 68—18)

This invention relates, in general, to centerpost agitator type washing machines and, more particularly, to means for removing lint from the wash or rinse water used in such machine.

Stationary filters and those mounted on oscillating agitators are common expedients for filtering lint from the wash or rinse water by passing a steady stream of water therethrough. However, these types of filters quickly lose their ability to remove lint from the water due to lint build-up in the perforations thereof. This is because lint remains in the perforations until removed by the user after the complete washing cycle has terminated. Furthermore, the stationary filter presents a cleaning problem since the lint is usually distributed over the entire surface of the filter which filter in many cases is very large.

Accordingly, it is the general object of this invention to provide a new and improved washing machine.

It is a more particular object of this invention to provide a new and improved filter for removing lint from the wash or rinse water used in washing machines.

Briefly, the above-cited objects are accomplished by providing a ring-shaped filter having an opening in the bottom thereof and a perforated receptacle removably attached to the filter subadjacent the opening. The filter which moves in one direction is so positioned that the stream of water, from the water recirculating nozzle, pushes the accumulated lint along the bottom wall of the filter and into the perforated receptacle. The receptacle is of sufficient capacity that it is unnecessary to clean after each use and, moreover, cleaning of the filter itself becomes unnecessary since water flow therethrough is not restricted by accumulation of lint.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figure 1:
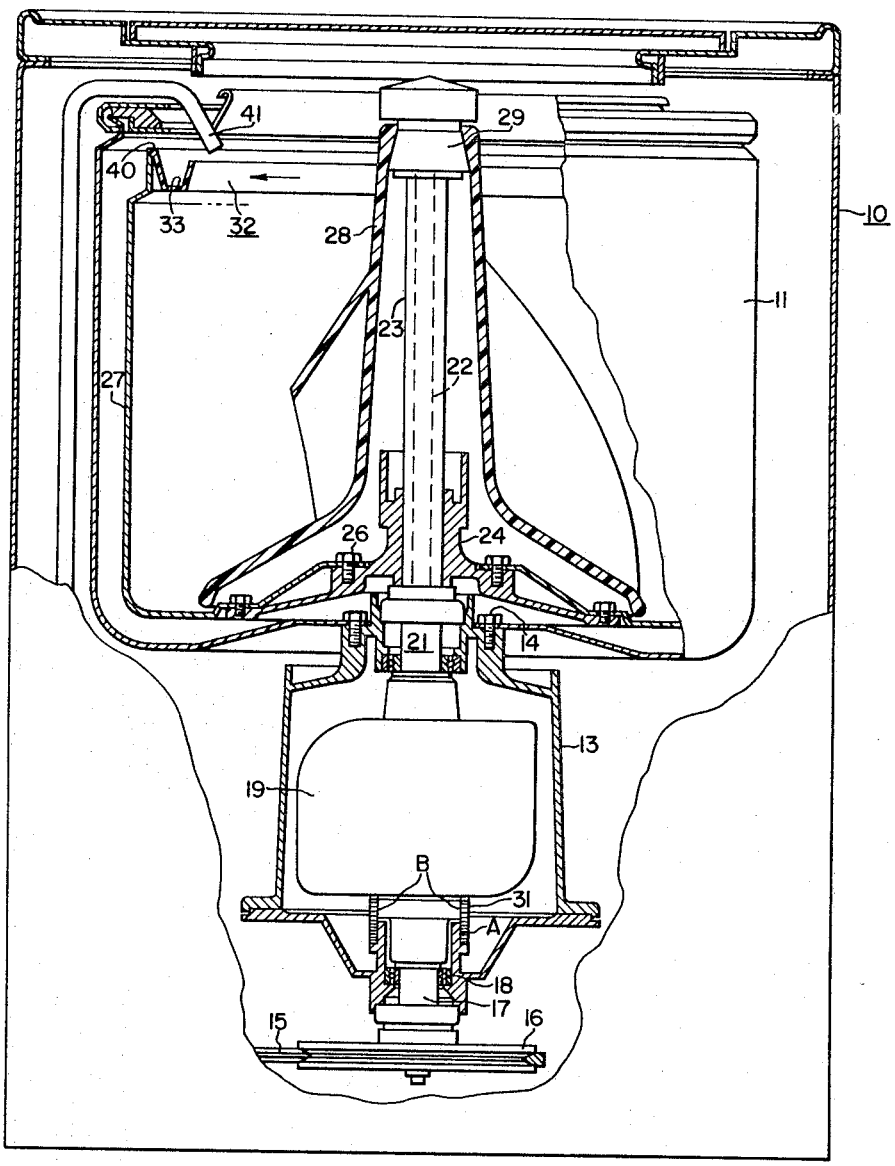
FIGURE 1 is a front elevational view, partly in section, of a clothes washing machine incorporating the invention.
Figure 2:
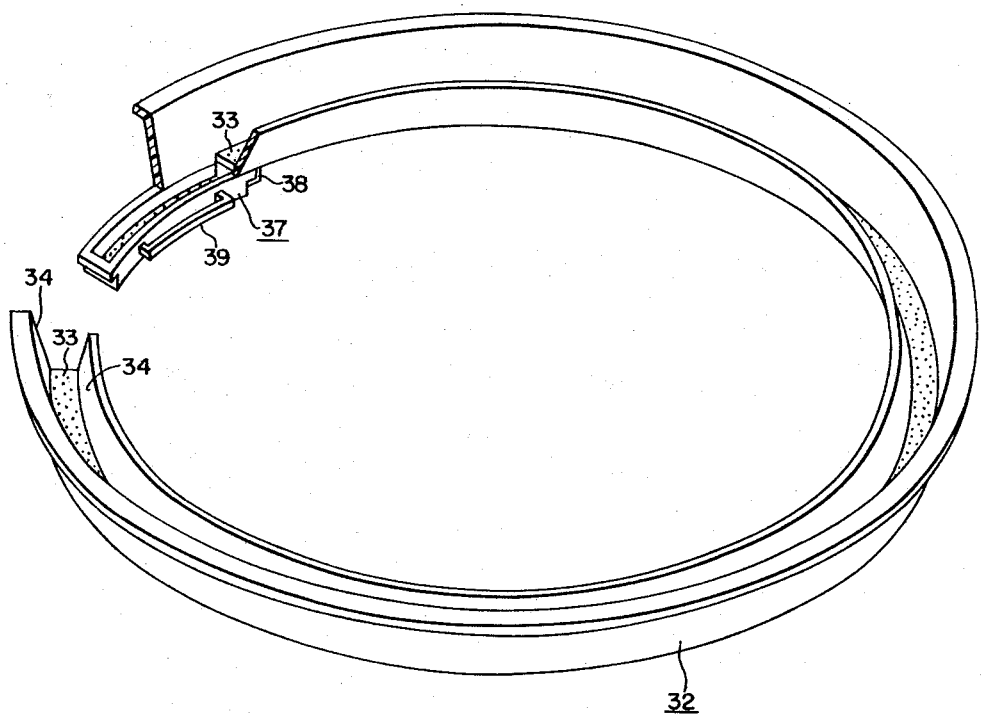
FIG. 2 is a perspective view, partly broken away, of the lint filter comprising this invention.

Referring to the drawings, especially FIG. 1, reference character 10 designates generally a clothes washing machine comprising a cabinet or housing 11 having an outer tub 12 rigidly secured within the cabinet to a gear housing 13 through bolts 14. Together the outer tub 12 and the gear housing 13 form a stationary structure. A pulley 16, driven by an external motor, not shown, and a belt 15, is connected to a drive shaft 17, supported by a bearing structure 18. The drive shaft 17 extends into a gear frame 19 and drives a gear train, not shown, disposed therein. The particular gearing of the gear train is not illustrated herein because such is well known in the art. The output which is provided by an output shaft structure 21 is in the form of the usual oscillating motion. The particular transmission may be of the coaxial type as commonly used, with the inner shaft of the coaxial structure driving the agitator of the washer and the outer shaft or spin tube being used for the spin cycle of the washing apparatus as well as imparting unidirectional rotation to the tub 27 as will be discussed below.

In the present example, the inner shaft of the coaxial driving shaft structure 21 is an inner drive shaft 22 and the outer tubular member is an outer spin tube 23. Fitted over the spin tube is a basket hub 24, which is rigidly keyed to the spin tube 22. Secured to the hub 24 through bolts 26 is a spin basket 27. The spin basket is concentrically disposed with respect to the outer tube 23 and serves to hold clothes to be washed. Apertures, not shown, are provided in the walls of the spin basket 27 so that washing fluid may readily pass into and out of the basket.

An agitator member 28 is fitted over the coaxial output shaft structure 21 and attached to the inner drive shaft 22 via a hub connector 29. The agitator is thus driven in an oscillating manner during the wash cycle. The spin basket 27 is connected to the outer spin tube 23 which is not rotatable in both directions, as will be discussed below. The agitator motion and the motion of the spinner basket are thus independent of each other. The spin tube 23, the basket hub 24, the spin basket 27, and the gear frame 19, therefore, move and may rotate as one unit.

To provide, during the wash cycle, that the spin basket 27 can rotate in only one direction, an overriding clutch arrangement 31 is provided. The overriding clutch, in the embodiment shown, comprises, a coil spring having a square cross section, and made from any suitable material, for example, steel wire. The coil of wire is disposed over the gear housing 13 at the area A, with one end being fitted to the gear housing at area A. The upper portion of the clutch 31 is fitted around area B of the gear frame 19. The operation of the overriding clutch is such that rotation of the gear frame 19 in a clockwise direction as viewed from the top of the washer 10 will cause the square cross section wire to tighten and thus exert forces at the areas A and B to rigidly hold the gear frame 19 at area B to the stationary gear housing 13 by exerting pressure at area A. When rotation is in the opposite direction, however, the wire or clutch 31 will tend to loosen and permit the gear frame 19 and the basket 27 to rotate step by step in the direction of the arrow with respect to the stationary gear housing 13.

Figure 3:
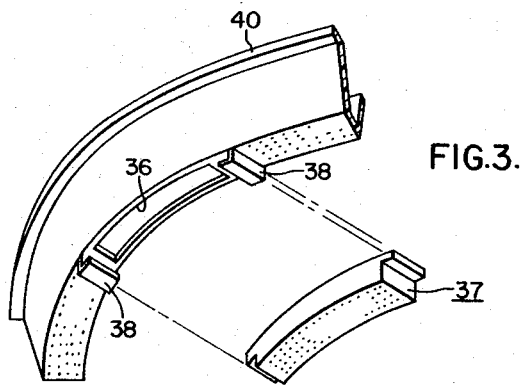
FIG. 3 is a fragmentary perspective view illustrating a removable receptacle which is a part of the filter shown in FIG. 2.

A ring-shaped lint filter 32 made from any suitable material, for example, plastic, comprises a horizontally extending perforated bottom wall 33 joined to concentrically spaced inner and outer imperforate vertical extending walls 34. This bottom wall is provided with an opening 36 (see FIG. 3) and has a receptable 37 removably secured thereto, subadjacent the opening 36. The bottom wall of the receptacle, which is secured to the bottom wall 33 of the filter by a pair of L-shaped brackets 38, is perforated so that it serves to pass water therethrough to thereby remove lint from the water. The receptacle may be provided with a handle 39 for facilitating removal thereof for cleaning by the user.

The outer vertical wall of the filter is provided with a flange 40 by which the filter may be mounted on the upper edge of the spin basket 27 (see FIG. 1). The filter so mounted moves in a step by step motion in one direction. The filter is positioned with respect to a water recirculating nozzle 41 such that it intercepts the stream of wash or rinse water emitted from the nozzle, thereby removing the lint therefrom. As the basket 27 and filter 32 move in the direction of the arrow (see FIG. 1) the stream of water emitted from the nozzle 41 pushes the accumulated lint along the bottom wall 33 until the lint is deposited in the receptacle 37 as the latter approaches the fixed position of the inlet nozzle 41. The receptacle is of sufficient capacity that it need not be cleaned after each wash cycle.

While there has been shown and described what is at present considered to be the preferred embodiment of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. A lint filter for a washing machine having an upright oscillating agitator and a tub adapted for unidirectional rotation, said lint filter comprising: a ring-like member concentrically spaced with respect to said agitator and in a position to intercept recirculating water from a water recirculating nozzle of the washing machine, said filter having a horizontally extending perforated bottom wall joined to concentrically spaced inner and outer imperforate vertically extending walls, means in said outer wall mounting said filter on said tub for movement therewith whereby lint trapped by said bottom perforate wall is pushed by the water emitted from said nozzle in the direction opposite to movement of said filter, said bottom wall having an opening therein between said vertical walls, a perforate receptacle, and means for removably securing said receptacle to said bottom wall adjacent said opening for receiving the lint pushed along said bottom wall as said receptacle passes said water recirculating nozzle.

2. In a washing machine apparatus, in combination, a tub member, an agitator member mounted concentrically with said tub member, a ring-shaped lint filter carried by one of said members, means for rotating each of said members, a water recirculating nozzle positioned with respect to said filter so as to emit a stream of water thereinto whereby the accumulated lint is moved along the bottom of said filter in a direction opposite the movement of said filter, said filter having at least one opening in the bottom thereof, and a perforate receptacle removably supported beneath said opening for receiving said accumulated lint.

3. In washing machine apparatus in combination, a tub member, an agitator member mounted concentrically with said tub member, a ring-shaped lint filter carried by one of said members, means for rotating said filter carrying member in one direction, a nozzle positioned to emit a stream of water into said lint filter whereby lint is moved along the filter in a direction opposite to movement of said filter, a substantially perforate receptacle removably attached to said filter subadjacent an opening in a bottom wall thereof, the lint moved along the bottom of said filter being deposited in said receptacle after said filter has made a complete rotation.

4. In washing machine apparatus in combination, a tub member, an agitator member mounted concentrically with said tub member, a ring-shaped lint filter carried by one of said members, a nozzle positioned to emit a stream of water into said lint filter, means for rotating said lint filter member to produce relative movement between said stream of water and the latter whereby lint is moved along the filter in a direction opposite to movement of said filter; said filter comprising a perforate bottom wall having an opening therein and joined to concentrically spaced inner and outer imperforate vertical walls and a perforate receptacle supported beneath said opening for receiving the lint moved along said bottom wall by said stream of water.

References Cited

UNITED STATES PATENTS

| | | | |
|---|---|---|---|
| 2,481,979 | 9/1949 | Colley | 68—18 |
| 2,509,753 | 5/1950 | Woodson | 68—18 |
| 2,943,474 | 7/1960 | Bochan | 68—18 |

WILLIAM I. PRICE, *Primary Examiner.*